United States Patent
Kim et al.

(10) Patent No.: US 6,433,857 B1
(45) Date of Patent: Aug. 13, 2002

(54) OPTICAL TRAINGULATION DISPLACEMENT SENSOR USING A DIFFRACTION GRATING

(75) Inventors: Soo Hyun Kim; Kyung Chan Kim; Se Baek Oh, all of Taejon (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 09/838,435

(22) Filed: Apr. 19, 2001

(30) Foreign Application Priority Data

Nov. 23, 2000 (KR) ........................ 2000-70038

(51) Int. Cl.[7] ............... G01C 3/00; G01C 3/08; G03B 13/00; G03B 15/02; G02B 27/40; G02B 27/64; G02B 7/04

(52) U.S. Cl. ............... 356/3.01; 356/3.06; 396/106; 250/201.6

(58) Field of Search ............... 356/3.01–3.16; 396/106; 250/201.6

(56) References Cited

U.S. PATENT DOCUMENTS

| | | | |
|---|---|---|---|
| 4,310,227 A | * 1/1982 | Zinchuk | 354/25 |
| 4,349,274 A | 9/1982 | Steele | 356/3.04 |
| 4,575,211 A | * 3/1986 | Matsumura et al. | 354/403 |
| 4,948,258 A | * 8/1990 | Caimi | 356/376 |
| 5,272,512 A | * 12/1993 | Kadowaki et al. | 356/28 |
| 5,313,262 A | * 5/1994 | Leonard | 356/5 |

* cited by examiner

Primary Examiner—Thomas H. Tarcza
Assistant Examiner—Brian Andrea
(74) Attorney, Agent, or Firm—Anderson Kill & Olick, PC

(57) ABSTRACT

Disclosed herewith is an optical triangulation displacement sensor using a diffraction grating. The optical triangulation displacement sensor includes a light source element, a condenser, a light-receiving element, an image formation lens, a transmission grating and a light-receiving element. The light source element generates light of certain intensity. The condenser receives the light from the light source element and transmits the light to the surface of measurement. The image formation lens receives the light reflected by the surface of measurement. The transmission grating converts the reflected light having passed through the image formation lens into a plurality of diffracted light rays. In the light-receiving element, an image is formed by the diffracted light rays incident from the transmission grating.

9 Claims, 6 Drawing Sheets

OPTICAL TRAINGULATION DISPLACEMENT SENSOR USING A DIFFRACTION GRATING

BACKGROUND OF THE INVENTION

1. Field of the Invention

The present invention relates generally to an optical triangulation displacement sensor using a diffraction grating, and more particularly to an optical triangulation displacement sensor using a diffraction grating, in which a transmission grating is disposed between an image formation lens and a light-receiving element so that a light ray having passed through the image formation lens is divided into a plurality of light rays by the diffraction grating and the diffracted light rays form an image in the light-receiving element. That is, the present invention relates to an optical triangulation displacement sensor using a diffraction grating, which is capable of averaging errors caused by the noise of a light-receiving element by applying an arithmetic mean method in the same size of that for a conventional sensor head within the same sampling time.

2. Description of the Prior Art

FIG. 1 is a schematic diagram of a conventional optical triangulation displacement sensor. FIG. 2 is a graph showing the optical intensity distribution of the light-receiving element shown in FIG. 1. As depicted in FIGS. 1 and 2, a light source element 100 generating light of certain intensity emits light to a condenser 200, and the condenser 200 passes light to a surface of measurement 10. The light incident upon the surface of measurement 10 is reflected, passes through an image formation lens 300, and forms certain strength distribution in a light-receiving element. As the surface of measurement moves, the light intensity distribution also shifts.

In this case, when the peak position of the light intensity distribution is extracted by a signal processor unit 600, the positional information of the surface of measurement 10 with regard to the peak position of the light intensity distribution can be obtained and that is linear relation.

In the conventional optical triangulation displacement sensor 700, measurement is performed several times and measured values are averaged to reduce effects of errors. In the conventional optical triangulation displacement sensor 700, various noises affecting optical intensity distribution assume random noise patterns. If the measurement values are averaged, there occur problems that excessive time is required for measurements because of a decrease in the standard deviation of the noises and errors are caused by the movement of the surface of measurement.

In order to solve the problems, a plurality of light-receiving elements 500 are suitably arranged in the conventional optical triangulation displacement sensor 700, and values measured by the elements 500 are utilized in a mean form. The conventional optical triangulation displacement sensor 700 employs a plurality of light-receiving elements and averages measured values, so there occur problems that the size of sensor head should be enlarged and excessive costs are incurred.

The errors of the optical triangulation displacement sensor 700 caused by a variation in the output of a light source can be reduced by sensing the output of the light source in a real time. However, other errors can be caused by other factors, so there occurs a shortcoming that the size of a sensor head should be enlarged.

SUMMARY OF THE INVENTION

Accordingly, the present invention has been made keeping in mind the above problems occurring in the prior art, and an object of the present invention is to provide an optical triangulation displacement sensor using a diffraction grating, in which a transmission grating is disposed between an image formation lens and a light receiving-element so that a light ray having passed through the image formation lens is divided into a plurality of light rays by the diffraction grating and the diffracted light rays form an image in the light-receiving element. Finally, several results of the surface of measurement are detected simultaneously, the new measurement result can be obtained by averaging them. That is, the present invention relates to an optical triangulation displacement sensor using a diffraction grating, which is capable of averaging errors caused by the noise of a light-receiving element by applying an arithmetic mean method in the same size of that for a conventional sensor head within the same sampling time.

In order to accomplish the above object, the present invention provides an optical triangulation displacement sensor using a diffraction grating, comprising a light source element for generating light of certain intensity, a condenser for receiving the light from the light source element and transmitting the light to the surface of measurement, an image formation lens for receiving the light reflected by the surface of measurement, a transmission grating for converting the reflected light having passed through the image formation lens into a plurality of diffracted light rays, and a light-receiving element in which an image is formed by the diffracted light rays incident from the transmission grating.

The optical triangulation displacement sensor may further compromise a transmission grating, the transmission grating being situated between the image formation lens and the light-receiving element.

In the optical triangulation displacement sensor, an image formed in the light-receiving element is transmitted to a signal processing unit, and the positional information of the surface of measurement with regard to the optical triangulation displacement sensor is acquired by the signal processing unit.

In the optical triangulation displacement sensor, diffracted light rays having passed through the transmission grating create optical intensive distribution of a certain pattern in the light-receiving element.

In the optical triangulation displacement sensor, diffracted light rays generated by the transmission grating form an image in the light-receiving element to be arithmetically averaged within a predetermined sampling time.

In the optical triangulation displacement sensor, the light-receiving element may be a CCD light-receiving element that is capable of acquiring entire optical intensity over space.

In the optical triangulation displacement sensor, diffracted light rays generated by the transmission grating may be −1-order light ray, 0-order light ray and +1-order light ray.

BRIEF DESCRIPTION OF THE DRAWINGS

The above and other objects, features and other advantages of the present invention will be more clearly understood from the following detailed description taken in conjunction wit the accompanying drawings, in which.

DESCRIPTION OF THE PREFERRED EMBODIMENTS

Figure 1:
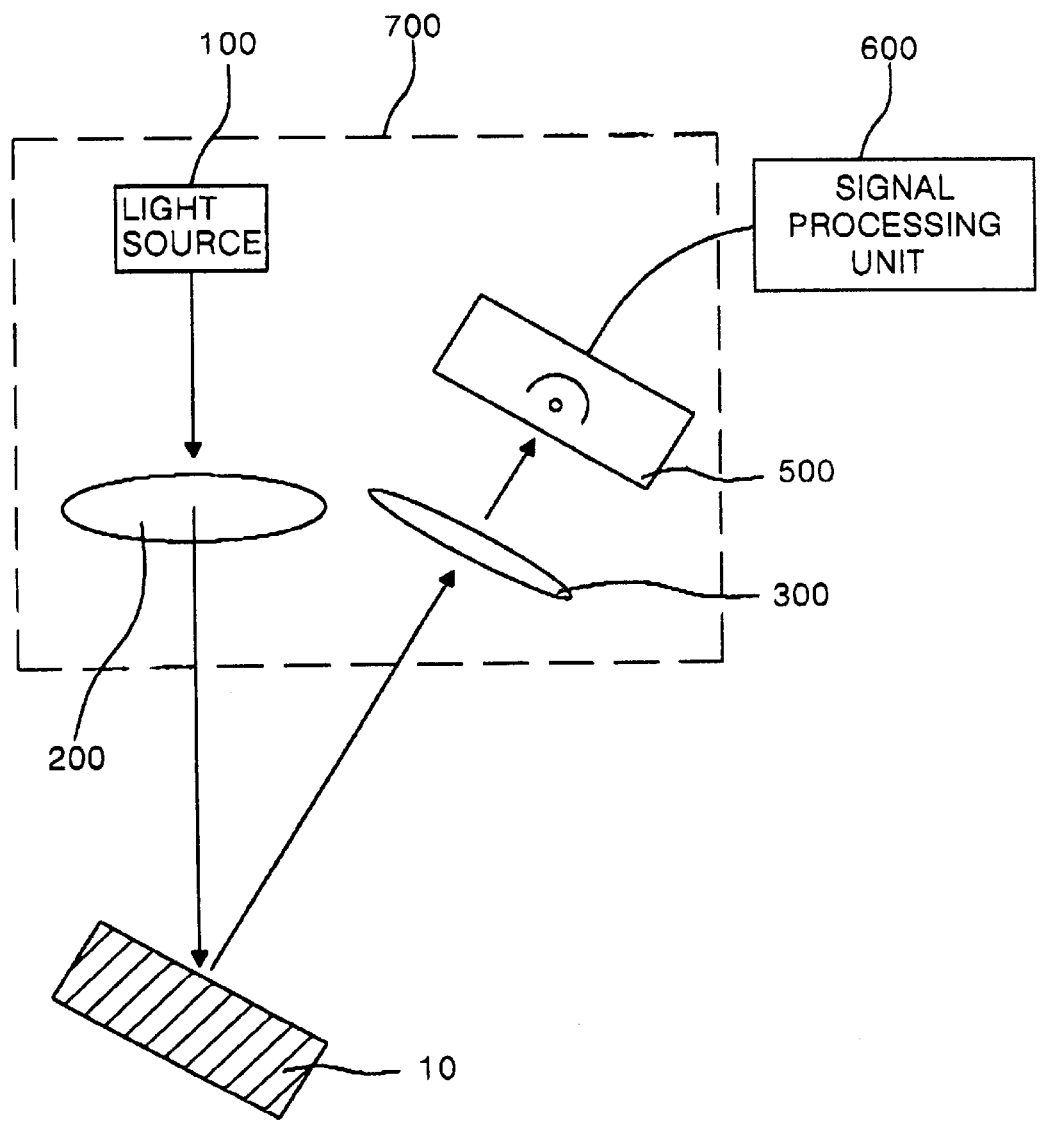
FIG. 1 is a schematic diagram showing the structure of a conventional optical triangulation displacement sensor.
Figure 2:
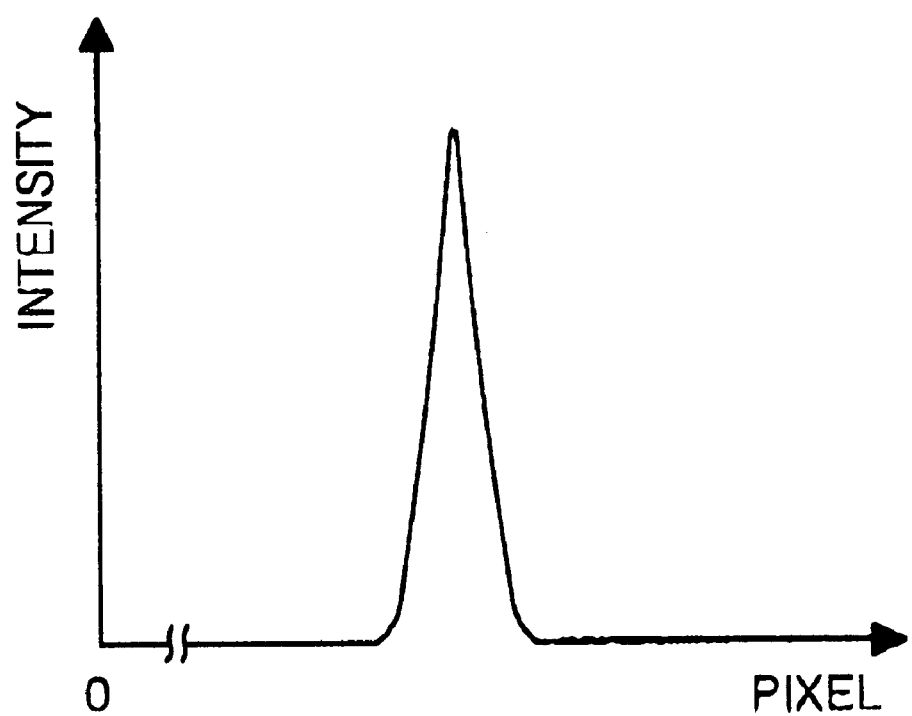
FIG. 2 is a graph showing the optical intensity distribution of the convention optical triangulation displacement sensor shown in FIG. 1.

Reference now should be made to the drawings, in which the same reference numerals are used throughout the different drawings to designate the same or similar components.

Figure 3:
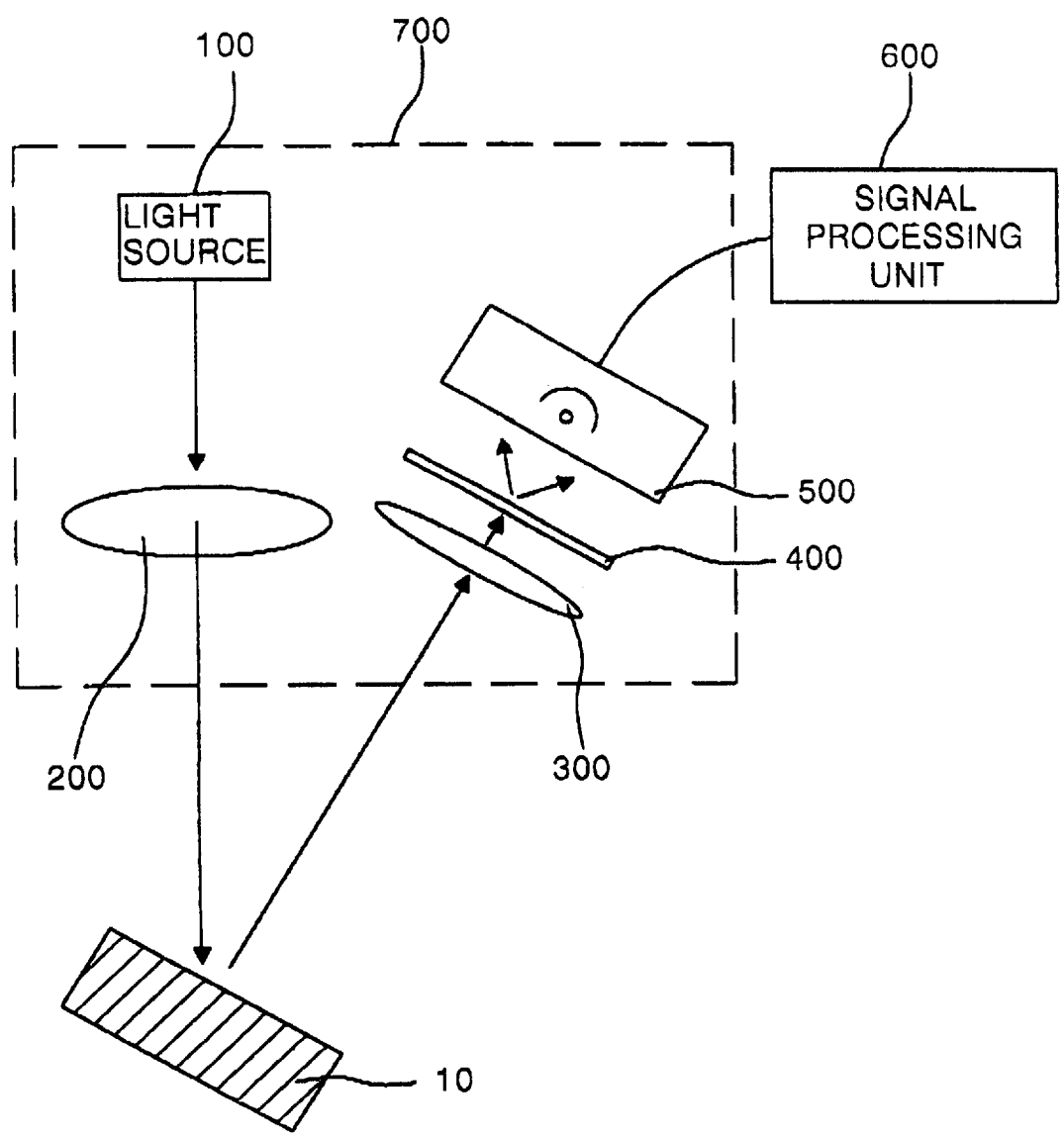
FIG. 3 is a schematic diagram showing the structure of an optical triangulation displacement sensor using a diffraction grating in accordance with the present invention.

FIG. 3 is a schematic diagram showing an optical triangulation displacement sensor with a diffraction grating in accordance with the present invention. As illustrated in FIG. 3, a light source element 100 generating light of certain intensity emits light to a condenser 200, and the condenser 200 passes the light to a surface of measurement 10. The light incident upon the surface of measurement 10 is reflected by the surface of measurement 10, passes through an image formation lens 300, and enters a transmission grating 400.

In this case, the transmission grating 400 generates a plurality of diffracted light rays, that is, 0-order diffracted light ray, −1-order diffracted light ray and +1-order diffracted light ray. The diffracted light rays enter a light-receiving element 500 and form a light intensity distribution having a certain pattern. In this case, the positional information of the surface of measurement 10 with regard to the optical triangulation displacement sensor 700 is obtained from the light intensity distribution by a signal processor unit 600.

Accordingly, the transmission grating 400 is disposed between the image formation lens 300 and the light-receiving element 500, so a light ray having passed through the image formation lens 300 is divided into a plurality of light rays by the transmission grating 400 and the diffracted light rays form an image on the light-receiving element 500. That is, the optical triangulation displacement sensor is capable of averaging errors caused by the noise of a light-receiving element by applying an arithmetic mean method in the same size of that for a conventional sensor head within the same sampling time. As a result, the accuracy of measurement is improved, and the errors caused by various optical elements as well as a light source can be reduced because of the improvement of resolution by a signal processing process.

Figure 4:
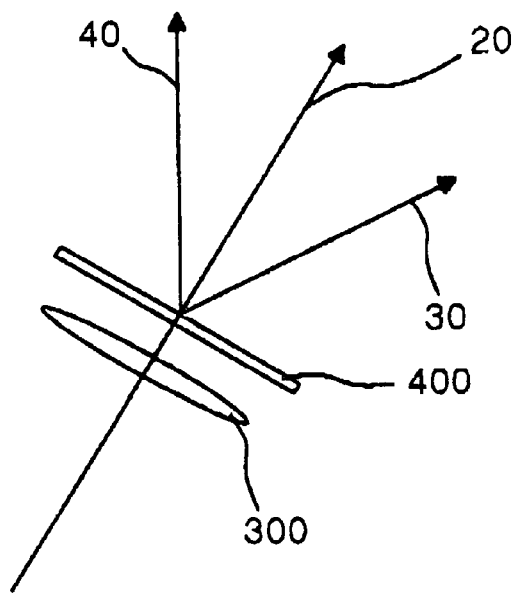
FIG. 4 is a view showing the optical paths of light passing through a transmission grating.

FIG. 4 is a view showing the optical paths of light that passes through the transmission grating 400 illustrated in FIG. 3. As indicated in FIG. 4, light reflected by the surface of measurement 10 passes through the image formation lens 300 and enters the transmission grating 400. The transmission grating 400 causes the light to be divided into a plurality of light rays (that is, 0-order diffracted light 20, −1-order diffracted light 40 and +1-order diffracted light 60) with predetermined interval angles. An image having a shape the same as in a case without the transmission grating 400 is formed in the light-receiving element 500.

Figure 5:
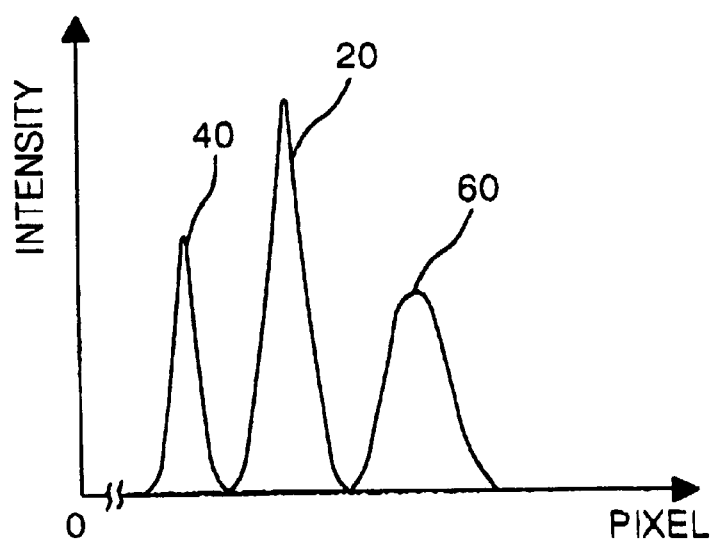
FIG. 5 is a graph showing the optical intensity distribution of the light-receiving element of FIG. 3.
Figure 6:
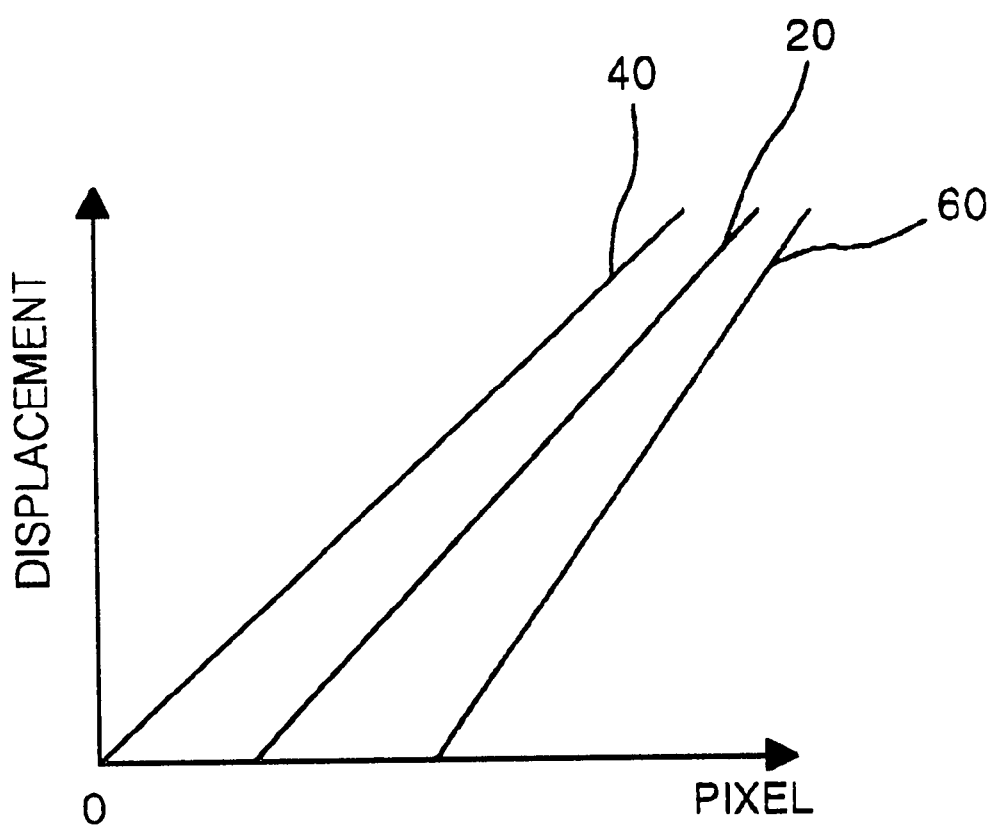
FIG. 6 is a graph showing the relation of the peak position of the optical intensity distribution of FIG. 5 and the displacement of the surface of measurement.

FIG. 5 is a graph showing the optical intensity distribution of the light-receiving element shown in FIG. 3. FIG. 6 is a graph showing the optical intensity distribution of the FIG. 5 in displacement-pixel relation. In FIG. 5, when a diffracted light ray enters the light-receiving element 500 from the transmission grating 400 and forms a shape, in the light-receiving element 500, the optical intensity distribution created in the light-receiving element 500 is illustrated in a waveform diagram. In this case, the optical intensity distribution caused by 0-order diffracted light ray 20 and −1-order diffracted light ray 40 and the optical intensity distribution caused by +1-order diffracted light ray 60 appear at the same time.

The optical intensity distribution portion caused by −1-order diffracted light ray 40, the optical intensity distribution portion caused by 0-order diffracted light ray 20 and the optical intensity distribution portion caused by +1-order diffracted light ray 60 are divided. In FIG. 6, the relation of the peak position of the optical intensity distributions and the displacement of the surface of measurement is shown. It means that three results of the surface of measurement can be attained simultaneously and it is possible to reduce the number of measurements and the averaging rime by averaging them.

Figure 7:
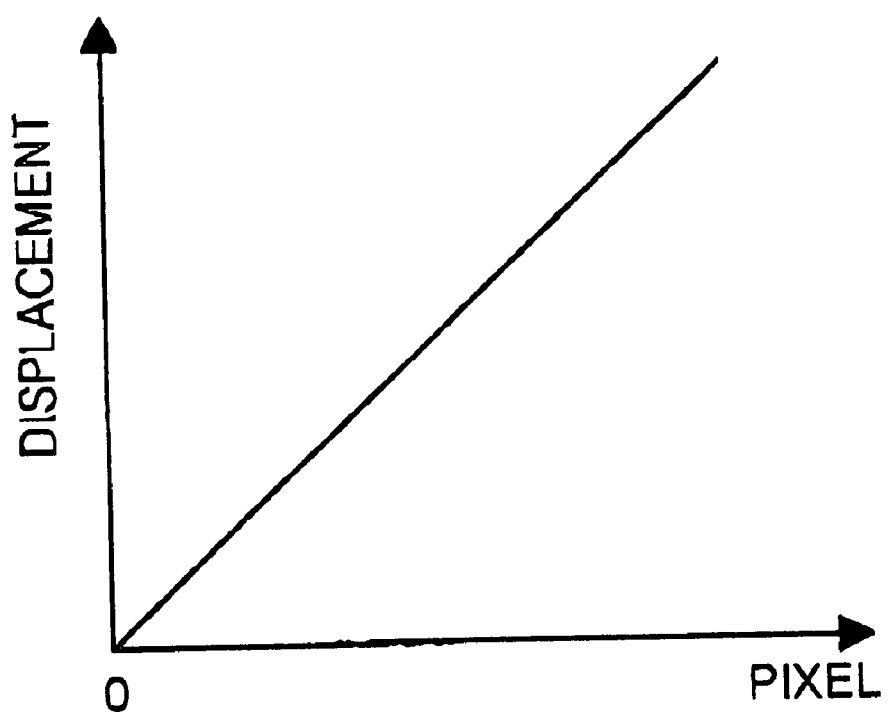
FIG. 7 is a graph showing the output of the optical triangulation displacement sensor using a diffraction grating by averaging three results in of FIG. 6.

FIG. 7 is a graph showing the output of the optical triangulation displacement sensor using a diffraction grating by averaging three results of FIG. 6. As shown in FIG. 7, an image formed in the light-receiving element 500 and transmuted to the signal processing unit 600 is arithmetically averaged in the same size of that for a conventional sensor head within the same sampling time, and outputted. Accordingly, the positional information of the surface of measurement with regard to the optical triangulation displacement sensor can be acquired.

As described above, the present invention provides an optical triangulation displacement sensor using a diffraction grating, in which the transmission grating is disposed between the image formation lens and the light-receiving element, thereby performing an arithmetic mean method in the same size as that for a conventional sensor head within the same sampling time.

The optical triangulation displacement sensor of the present invention can overcome shortcomings that the size of a sensor head is enlarged and the measuring time of a sensor is lengthened. Additionally, the optical triangulation displacement sensor of the present invention lowers the price of the optical triangulation displacement sensor and improves the resolving power of the optical triangulation displacement sensor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical triangulation displacement sensor using a diffraction grating, comprising:

a light source element for generating light of certain intensity;

a condenser for receiving the light from said light source element and transmitting the light to surface of an object;

an image formation lens for receiving the light reflected from said surface of said object;

a transmission grating for receiving the reflected light through said image formation lens and diffracting a plurality of diffracted light rays; and a light-receiving element for receiving the plurality of the diffracted light rays and forming a plurality of images thereon at a time.

2. The optical triangulation displacement sensor according to claim 1, further comprising a signal processing unit receiving electrical signals corresponding to the plurality of images and measuring a displacement of said object.

3. The optical triangulation displacement sensor according to claim 1, wherein each of said images formed on the light receiving element by diffracted light rays creates a spot with an optical intensity distribution.

4. The optical triangulation displacement sensor according to claim 2, wherein said signal processing unit averaging positions of the images.

5. The optical triangulation displacement sensor according to claim 1, wherein said light-receiving element is a charged coupled device (CCD).

6. The optical triangulation displacement sensor according to claim 4, wherein said averaged positions of the images by said signal processing unit are −1, 0 and +1-order light rays from said transmission grating.

7. A resolution enhancing method of an optical triangulation displacement sensor, comprising the steps of:
   generating a plurality of diffracting rays from a reflection light of a surface of an object;
   detecting the plurality of the diffracting rays;
   averaging positions of the diffracting rays; and
   measuring displacement of the object at a time.

8. The method according to claim 7, wherein said diffracting rays are generated by a transmission grating.

9. The method according to claim 7, wherein the plurality of diffracting rays are −1, 0, and +1 order rays.

* * * * *